No. 711,029. Patented Oct. 14, 1902.
H. S. WELKER.
OVEN.
(Application filed Nov. 18, 1901.)
(No Model.)

Witnesses
Inventor
H. S. Welker
Attorneys

UNITED STATES PATENT OFFICE.

HORACE S. WELKER, OF SHELBY, OHIO.

OVEN.

SPECIFICATION forming part of Letters Patent No. 711,029, dated October 14, 1902.

Application filed November 18, 1901. Serial No. 82,691. (No model.)

*To all whom it may concern:*

Be it known that I, HORACE S. WELKER, a citizen of the United States, residing at Shelby, in the county of Richland and State of Ohio, have invented certain new and useful Improvements in Ovens; and I do declare the following to be a full, clear, and exact description of the invention, such as will enable others skilled in the art to which it appertains to make and use the same.

This invention relates to improvements in ovens for gas, gasolene, oil, and other stoves.

The object of the invention is to provide an oven of this character in which provision is made for supplying heated air from the exterior to the interior of the oven, the air in its passage being guided over the flame from the burner and temporarily retarded, so as to be heated preliminary to its entrance into the oven, thereby increasing the efficiency of the oven.

With this and other objects in view the invention consists of certain novel features of construction, combination, and arrangement of parts, which will be hereinafter more fully described, and particularly pointed out in the appended claim.

Figure 1:
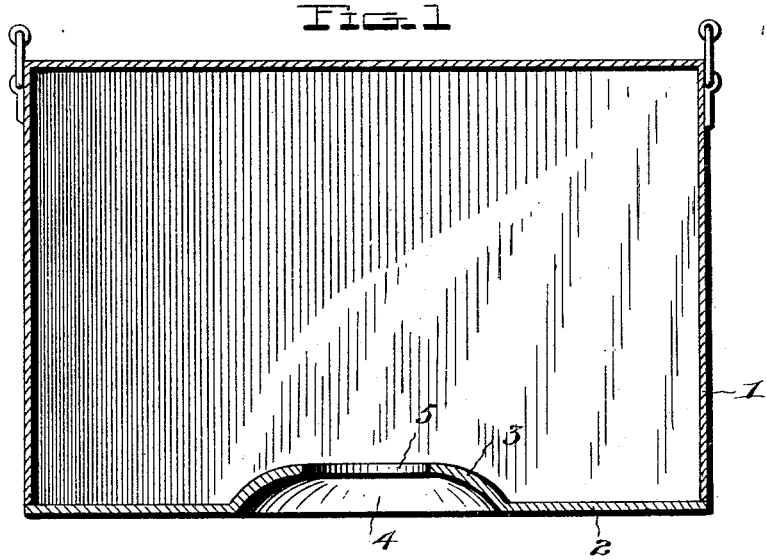
Figure 2:
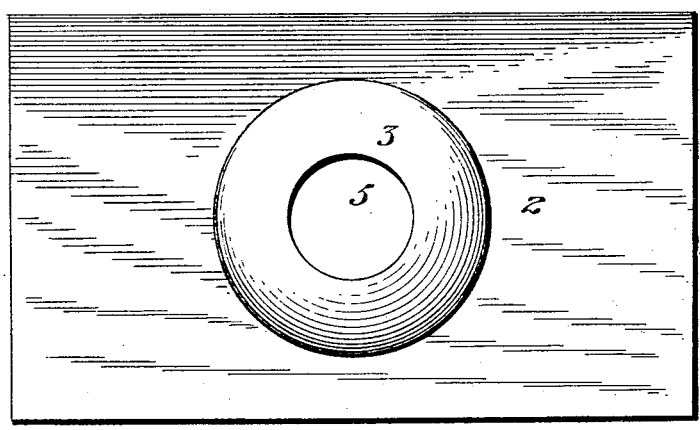
Figure 3:
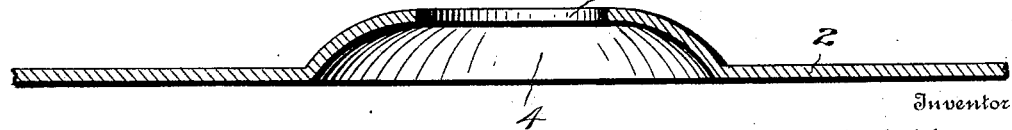

In the accompanying drawings, Figure 1 is a vertical longitudinal section through an oven embodying my invention. Fig. 2 is a detail top plan view of the oven-bottom, and Fig. 3 is a detail vertical section of the same.

Referring now more particularly to the drawings, the numeral 1 represents an oven of any desired form and construction and adapted to be utilized in connection with a gas, gasolene, oil, or other type of stove or heater, as desired.

In carrying out my invention I provide the bottom 2 of the oven with an inverted dished portion 3, forming a bottom cavity 4 for the reception and retention of the air prior to its entering into the oven. The crown or top wall of this inverted dished portion is cut away to form an opening 5 of less size or diameter than said cavity, the purpose of which is to restrict the flow of air into the oven in such manner that the air will be retained in the cavity until heated to the desired extent for admittance into the oven.

In the operation of the device the central portion of the oven-bottom is arranged immediately above the burner or heater, and the air in passing thereto is guided by the curved walls of the cavity directly over the burner and into said cavity, whereby the air is heated. Instead of passing directly into the oven, however, the contracted opening 5 causes the air to be temporarily retarded in its flow and to be confined in the cavity until heated, when it passes through said opening into the oven and maintains a high temperature therein to increase the efficiency of the oven in cooking.

From the foregoing description, taken in connection with the accompanying drawings, the construction and mode of operation of the device will be readily understood, and it will be seen that provision is made for effecting the heating of the air in a simple and effective manner, so as to adapt the oven for cooking in a much shorter period of time than ovens of ordinary construction.

Having thus described my invention, what I desire to claim by Letters Patent is—

An oven provided with a flat bottom portion having a central surrounding opening therein, an imperforate unobstructed surrounding curved wall rising upwardly from the surrounding opening and terminating in a flat top portion having an enlarged single opening intersecting the upper surrounding edge of the curved wall, said opening being in a direct line with and of a less diameter than the opening in the bottom of the oven, whereby to permit of the heat being deflected against said curved wall so that the same will pass directly through said enlarged single opening in the top of the curved wall and into the oven, substantially as specified.

In testimony whereof I have hereunto set my hand in presence of two subscribing witnesses.

HORACE S. WELKER.

Witnesses:
H. W. HILDEBRANT,
W. H. ALBACH.